(12) United States Patent
Stemmer et al.

(10) Patent No.: US 10,994,635 B2
(45) Date of Patent: May 4, 2021

(54) LONGITUDINAL ADJUSTER FOR VEHICLE SEAT

(71) Applicants: Adient Engineering and IP GmbH, Burscheid (DE); Adient Yanfeng Seating Mechanism Co., Ltd., Shanghai (CN)

(72) Inventors: Juergen Stemmer, Remscheid (DE); Erik Sprenger, Wermelskirchen (DE); Qi Wang, Shanghai (CN); Jian Chang, Shanghai (CN); Zhenyi Tang, Shanghai (CN); Stefan Josten, Rommerskirchen (DE)

(73) Assignees: Adient Engineering and IP GmbH, Burscheid (DE); Adient Yanfeng Seating Mechanism Co., Ltd., Shanghai (CN)

( * ) Notice: Subject to any disclaimer, the term of this patent is extended or adjusted under 35 U.S.C. 154(b) by 0 days.

(21) Appl. No.: 16/606,062

(22) PCT Filed: Apr. 19, 2018

(86) PCT No.: PCT/CN2018/083717
§ 371 (c)(1),
(2) Date: Oct. 17, 2019

(87) PCT Pub. No.: WO2018/192546
PCT Pub. Date: Oct. 25, 2018

(65) Prior Publication Data
US 2020/0039389 A1 Feb. 6, 2020

(30) Foreign Application Priority Data

Apr. 19, 2017 (CN) .......................... 201710256223.8

(51) Int. Cl.
*B60N 2/06* (2006.01)
*B60N 2/02* (2006.01)

(52) U.S. Cl.
CPC ........... *B60N 2/067* (2013.01); *B60N 2/0232* (2013.01); *B60N 2002/0236* (2013.01)

(58) Field of Classification Search
CPC .................. B60N 2/067; B60N 2/0232; B60N 2002/0236; B60N 2002/024; F16H 25/20; F16H 55/22
(Continued)

(56) References Cited

U.S. PATENT DOCUMENTS

| 9,290,111 | B2 * | 3/2016 | Enokijima | ........... B60N 2/0224 |
| 2008/0282822 | A1 | 11/2008 | Birker et al. | |
| 2014/0339392 | A1 * | 11/2014 | Enokijima | ........... B60N 2/0232 248/429 |

FOREIGN PATENT DOCUMENTS

| CN | 101528502 A | 9/2009 |
| CN | 104011434 A | 8/2014 |

(Continued)

*Primary Examiner* — Mark R Wendell
(74) *Attorney, Agent, or Firm* — Marshall & Melhorn, LLC

(57) ABSTRACT

A vehicle seat longitudinal adjuster (2) includes two guide rail pairs (P1, P2) with a first guide rail (3) and a second guide rail (4) movable with respect to the first guide rail, a motor unit (12), a gear unit (G) with a gear rotary shaft (6) connected to the first guide rail and a rotatable gear element (7). A transmission unit (11) is coupled with the gear unit and the motor unit to transmit torque to the gear rotary shaft. A gearbox (9) receives the gear unit. A support (5) receives the gearbox inside a gap (BR) formed between the guide rails and passes through a second rail opening (13) and extends out of the guide rail opening and closes the second rail opening. A vehicle seat (1), has the longitudinal adjuster for mechanically and longitudinally adjusting the vehicle seat.

20 Claims, 7 Drawing Sheets

(58) Field of Classification Search
USPC ......... 297/344.1; 296/65.13, 65.15; 248/424,
248/429, 422; 74/89.23, 425, 428, 458,
74/640
See application file for complete search history.

(56) References Cited

FOREIGN PATENT DOCUMENTS

| | | | |
|---|---|---|---|
| CN | 203752933 U | | 8/2014 |
| CN | 104249634 A | | 12/2014 |
| CN | 206900204 U | | 1/2018 |
| DE | 10230514 A1 | | 1/2004 |
| DE | 102008029152 A1 | | 1/2009 |
| DE | 102008046274 A1 | | 7/2009 |
| EP | 1442923 A2 | | 8/2004 |
| FR | 2928880 A1 | | 9/2009 |
| FR | 2921022 | * | 9/2014 |
| JP | 2003320873 A | | 11/2003 |

* cited by examiner

LONGITUDINAL ADJUSTER FOR VEHICLE SEAT

CROSS REFERENCE TO RELATED APPLICATIONS

This application is a United States National Phase Application of International Application PCT/CN2018/083717, filed Apr. 19, 2018, and claims the benefit of priority under 35 U.S.C. § 119 of Chinese Application 201710256223.8, filed Apr. 19, 2017, the entire contents of which are incorporated herein by reference.

TECHNICAL FIELD

The present invention relates to a longitudinal adjuster for a vehicle seat, in particular for a motor vehicle seat, and a vehicle seat.

TECHNICAL BACKGROUND

Longitudinal adjusters are already known from the prior art, wherein a gear mechanism is arranged in a gearbox and coupled to a seat guide rail of the longitudinal adjuster.

SUMMARY

An object of the present invention is to provide a longitudinal adjuster for a vehicle seat that is improved relative to the prior art, and an improved vehicle seat.

A longitudinal adjuster for a vehicle seat, in particular for a motor vehicle seat, for a motorized longitudinal adjustment of the vehicle seat, comprises a guide rail arrangement, having two guide rail pairs of seat guide rails, wherein the corresponding guide rail pair comprises a first seat guide rail and a second seat guide rail that is movable relative to the first seat guide rail. In addition, the longitudinal adjuster comprises: an electric motor unit; a gear unit having at least one gear rotary shaft connected firmly at least to the first seat guide rail of one of the pairs; and a rotatable gear element, such as a worm gear, which acts jointly with the gear rotary shaft. The longitudinal adjuster further comprises: a transmission unit, coupled to the gear unit and the electric motor unit in order to transmit a torsional force of the electric motor unit to the gear rotary shaft; and a gearbox which at least partially accommodates the gear unit; and a support for receiving the gearbox. Here, the support, together with the gearbox, is arranged in a cavity formed between the first seat guide rail and the second seat guide rail of one guide rail pair, and passes through a guide rail opening in the second guide rail and extends from the guide rail opening at least partially in such a way that the support closes the guide rail opening in the second guide rail.

In an exemplary embodiment, the support is formed in such a way that the gearbox is arranged between two fixing legs of the support, the fixing legs being spaced apart from one another in a longitudinal direction and extending vertically. Here, the two fixing legs are in particular coupled to the second seat guide rail, and in particular are connected to the second seat guide rail at least in a shape-fitting or force-fitting manner.

In another embodiment, the support is formed in a U-shape, wherein a leg opening of the support formed in the U-shape points in the direction of the first seat guide rail, and a middle space formed by the fixing legs comprises the gearbox. Thus, the gearbox is covered in relation to an upper side of the second seat guide rail (i.e. the upper guide rail) by means of a section of the support connecting the two fixing legs. The U-shaped support for example has the shape of a clamp element and/or a saddle seat. In addition, each of the fixing legs has a through-opening for causing the gear rotary shaft to run through.

An advantage achieved by the present invention is in particular that the longitudinal adjuster can be formed to be compact as possible by means of the support according to the present invention. Thus, a guide rail arrangement that is substantially flatter and more compact than a conventional guide rail arrangement can in particular be formed. For this purpose, additional reinforcing elements and covering elements for fixing and protecting the gearbox are for example omitted. Due to an installation height (in a vertical direction) required by the gear element (worm gear) screwed onto the gear rotary shaft, the gearbox for example extends from the upper side of the second seat guide rail.

In an exemplary embodiment of the longitudinal adjuster, the support formed in the U-shape is at least connected to the second seat guide rail in a shape-fitting, force-fitting and/or material-fitting manner. Exterior contours of the fixing legs and the section connecting the fixing legs are in particular correspondingly matched to a guide rail shape characteristic (in particular a guide rail interior shape characteristic) of the second seat guide rail. Thus, other fastening elements (e.g. screws or rivets) are not needed to fasten the support of the second guide rail (in particular the upper guide rail). By means of this type of exterior contour of the support corresponding to the guide rail interior contour/guide rail interior shape characteristic, the support can be secured in the second guide rail in a shape-fitting or force-fitting manner, e.g. by clamping or gripping, at an inner side. It is thereby possible to reduce installation time and lower material costs.

In a feasible embodiment, the support is secured in the guide rail opening of the second guide rail in a force-fitting or shape-fitting manner, in particular secured by clamping or gripping. For this purpose, the fixing legs are for example formed to be flexible. The fixing legs are for example formed in the form of elastic clamping arms, wherein when the support is inserted by means of the fixing legs pointing toward the guide rail opening, the fixing legs are pressed inward against a spring force. In an inserted state, the fixing legs automatically and elastically bite outward and clamp the support in the guide rail opening. In other words: the support is for example secured in a clamping seat in the guide rail opening.

Additionally or alternatively, the support may be secured in a force-fitting or shape-fitting manner, in particular secured by clamping or gripping, in a recess in a side wall of the second guide rail.

Thereby, the longitudinal adjuster may be formed in such a way that the second seat guide rail comprises multiple recesses. The upper side of the seat guide rail has at least one recess as the guide rail opening; the guide rail opening is used for receiving the connecting section of the support formed in the U-shape. The mechanical strength and load capacity of the second seat guide rail are for example lowered in the longitudinal direction and a transverse direction, by means of the guide rail opening formed in the upper side.

The guide rail opening is closed simply and the gearbox is covered toward the outside by means of the arrangement, inverted in particular in relation to the vertical axis, of the U-shaped support (also called a securing clamp) having a closed section extending upward from the second seat guide rail in an inserted state of the support.

Here, the U-shaped support with the inverted arrangement can at least be arranged in a shape-fitting or force-fitting manner in the guide rail opening of the second seat guide rail and used as a reinforcing element of the second seat guide rail. In addition, a box body region, extending from the upper side of the second seat guide rail, of the gearbox is covered by the support and protected from external influences. Thus, the U-shaped support is arranged to be used for fastening and locating and covering the gearbox and used for reinforcing the second seat guide rail.

In addition, a space below the U-shaped support, in particular a space between the first seat guide rail (the lower guide rail) and the support, is expanded. For this purpose, the fixing legs for example extend outward and are arranged at a predetermined leg angle relative to each other. Due to the inverted arrangement of the U-shaped support, this expanded space is in particular located below the connecting section and points inward toward the guide rail interior space and forms the guide rail interior space. Thus, other components of the longitudinal adjuster may be arranged in these internal installation spaces which are thereby formed again.

The support for example has a width of 17.8 mm (in the transverse direction), a height of 32 mm (in the vertical direction) and a length of 29.4 mm (in the longitudinal direction). The distance between an upper side of the gearbox and a lower side of the support may for example be 1.7 mm. The total weight of a structural unit formed by the support and the gearbox having the gear element is for example 66.9 g.

In an improved solution, a box body side part of the gearbox may be formed to be narrow to a very large degree, such that the gearbox has a width (in the transverse direction) in the range of 15 mm-20 mm, e.g. 17 mm; a height (in the vertical direction) in the range of 20 mm-30 mm, e.g. 27 mm; and a length (in the longitudinal direction) in the range of 20 mm-26 mm, e.g. 24 mm. The weight of the gearbox having the gear element arranged inside the gearbox is for example in the range of 30 g-38 g, e.g. 34 g.

In addition, the support formed in the U-shape can be produced in a simple manner. For example, the U-shaped support can be produced by means of an injection moulding method or a pressing method and/or a folding method.

A feasible embodiment of the longitudinal adjuster proposes that the fixing legs respectively comprise at least multiple protruding parts arranged at a lateral edge region, wherein shapes of corresponding protruding parts correspond to shapes of lateral recesses of the second seat guide rail. The protruding parts are in particular correspondingly arranged in a lower lateral edge region of the fixing legs. In addition, the protruding parts are correspondingly formed to be stepped. The support is at least secured in a force-fitting or shape-fitting manner, in particular fastened, in the second seat guide rail.

In another embodiment, the protruding parts are at least formed in a flexible manner, e.g. formed of plastic, wherein the protruding parts are secured, in particular secured in a clamping, locking or biting manner, in the corresponding recesses in order to perform shape-fitting or force-fitting connection. In another embodiment, the protruding parts are for example formed to be graded. This can achieve pre-locking of components of the longitudinal adjuster when the longitudinal adjuster is being assembled, for example for the orientation of these components, and thereby achieve fixing of these components with respect to each other.

In another embodiment, the gearbox is at least connected to the fixing legs of the support formed in the U-shape. Thus, the gearbox is supported by the fixing legs in particular when the second seat guide rail is executing longitudinal shifting.

Additionally, viewed in the longitudinal direction, the guide rail opening has a stop element for the outwardly extending fixing leg at opposite opening sides respectively. Alternatively or additionally, each fixing leg may have an outward-pointing locking nose at a leg outer side thereof; the locking nose is for example engaged in the associated stop element in a locking manner.

In an improved solution, a vehicle seat is equipped with the longitudinal adjuster, for the purpose of longitudinally adjusting the vehicle seat in a motorized fashion.

Embodiments of the present invention are explained in detail by means of the accompanying drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1A:
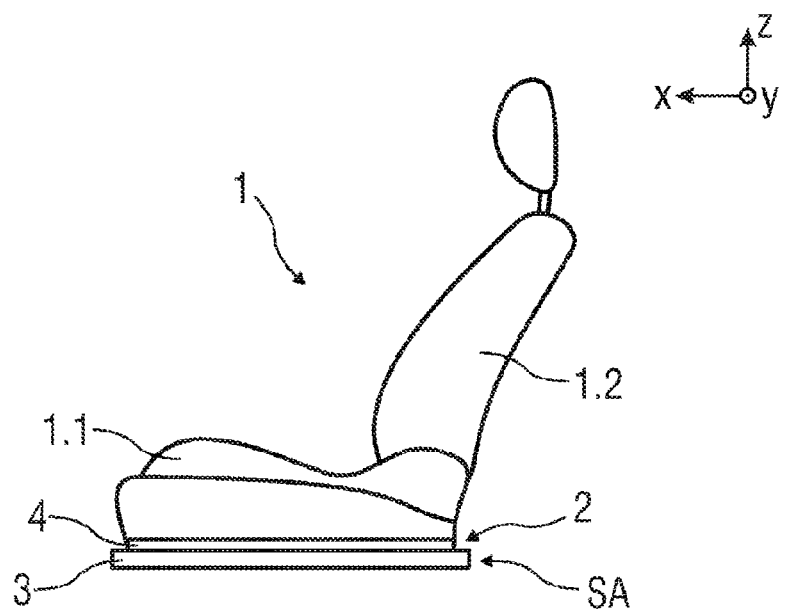
FIG. 1A is a schematic side view of a vehicle seat having a longitudinal adjuster.

Referring to the drawings, FIG. 1A shows a side view of a feasible embodiment of a vehicle seat 1, the vehicle seat comprising at least one longitudinal adjuster 2 having a guide rail arrangement SA.

Figure 1B:
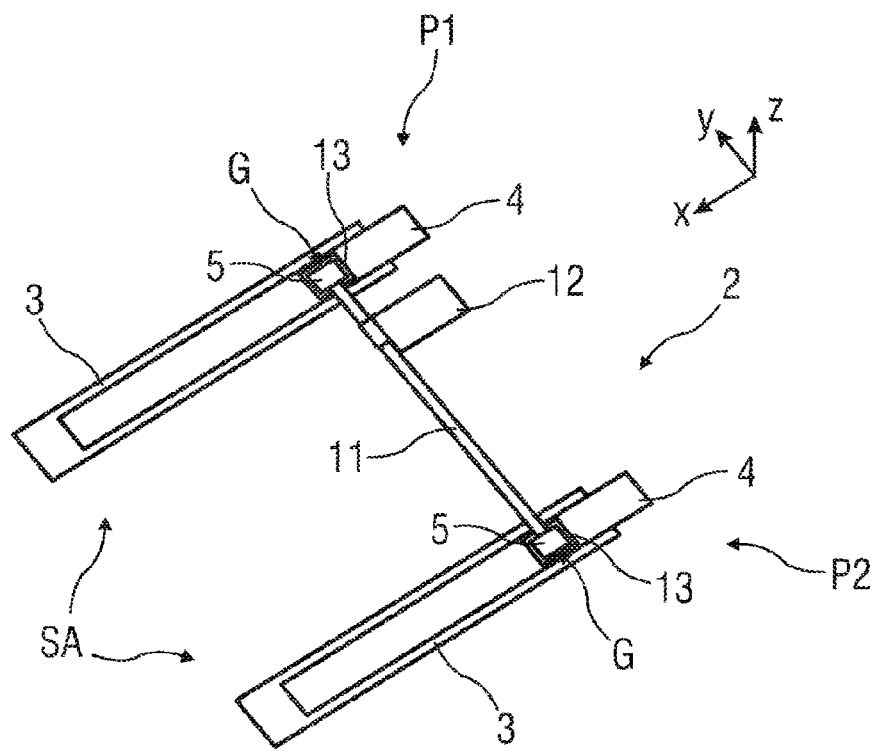
FIG. 1B is a schematic perspective view of a guide rail arrangement for a longitudinal adjuster.

FIG. 1B shows a perspective view of a feasible embodiment of a longitudinal adjuster 2 having a guide rail arrangement SA.

Here, the arrangement of the vehicle seat 1 in a vehicle is defined by means of the coordinate system used below; the coordinate system comprises a vertical axis z designated for a vertical direction of the vehicle, a longitudinal axis x designated for a longitudinal direction of the vehicle and a transverse axis y designated for a transverse direction of the vehicle.

The vehicle seat 1 for example comprises a seat face 1.1 and a backrest 1.2 arranged at the seat face 1.1.

The longitudinal adjuster 2 is arranged to be used for longitudinal movability of the vehicle seat 1, and as shown in FIG. 1B comprises two guide rail pairs P1, P2 of seat guide rails 3, 4.

Thereby, the corresponding guide rail pair P1 or P2 has a lower first seat guide rail 3, and an upper second seat guide rail 4 that is movable in the longitudinal direction relative to the lower seat guide rail 3. In the embodiment shown, the upper seat guide rail 4 is arranged and fastened at the seat face 1.1.

The lower seat guide rail 3 is arranged so as to be fixed relative to the vehicle and is fastened at a vehicle structure, e.g. at a vehicle base plate.

The lower first seat guide rail 3 and the upper second seat guide rail 4 in particular form an independent guide rail pair P1, P2, wherein one guide rail pair P1 or P2 is arranged on each side of the vehicle seat 1 for example.

The longitudinal adjuster 2 comprises a gear unit G, which is connected, in particular loosenably connected, at least to the first seat guide rail 4 of at least one of the guide rail pairs P1. In the embodiment shown, the two guide rail pairs P1, P2 both have one gear unit G.

The two guide rail pairs P1, P2 are connected to each other by means of a transmission unit 11. In order to longitudinally adjust the seat 1 in a motorized fashion, an electric motor unit 12 is provided; the electric motor unit is coupled to the transmission unit 11.

As shown below in FIGS. 2A and 2B, the gear unit G comprises at least one gear rotary shaft 6, the gear rotary shaft having a rotatable gear element 7, such as a threaded worm gear, which acts jointly with the gear rotary shaft.

The transmission unit 11 is coupled to the gear unit G and the electric motor unit 12 in order to transmit a torsional force of the electric motor unit 12 to the gear rotary shaft 6.

Figure 2A:
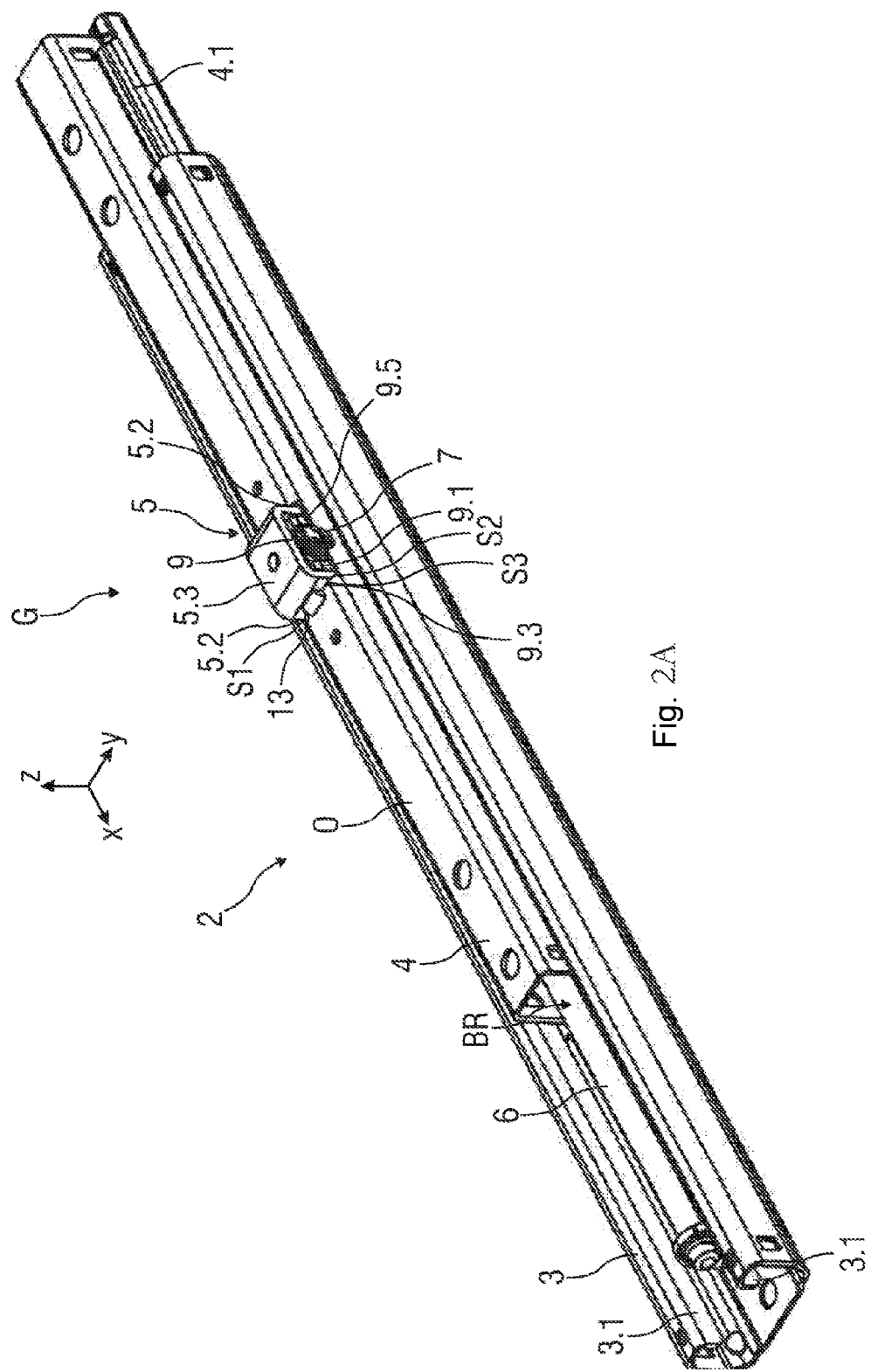
FIG. 2A is a schematic perspective view of an embodiment of the longitudinal adjuster.
Figure 2B:
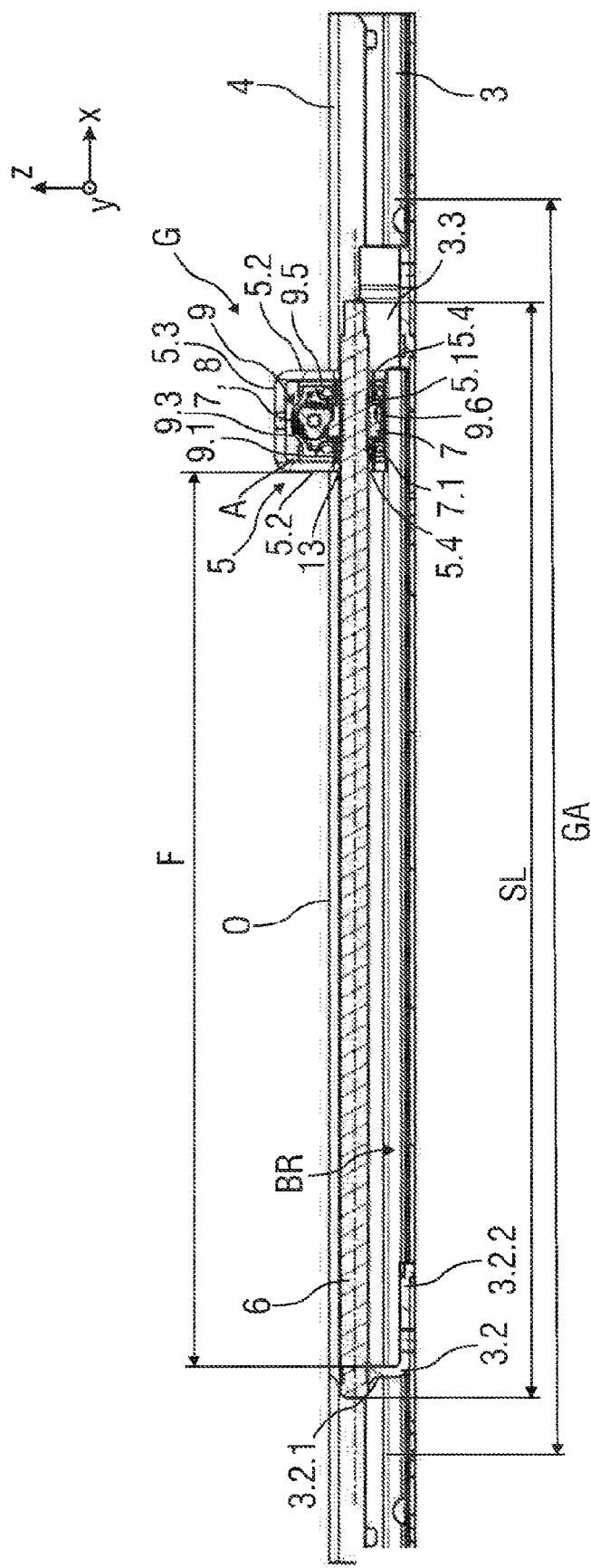
FIG. 2B is a schematic sectional view of an embodiment of the longitudinal adjuster.

In addition, as shown in FIGS. 2A and 2B, the gear unit G is accommodated at least partially by means of at least one gearbox 9.

The longitudinal adjuster 2 comprises a support 5 in order to receive the gearbox 9; as shown in FIGS. 1B and 2A-2B, the support extends partially from the upper seat guide rail 4.

FIGS. 2A and 2B show a perspective view or a sectional view of the longitudinal adjuster 2; the longitudinal adjuster comprises the lower seat guide rail 3, the upper seat guide rail 4 and the gear unit G.

Here, the support 5, together with the gearbox 9 that is received and secured in the support 5, is arranged in a cavity BR (also called a structural space) formed between the lower first seat guide rail 3 and the upper second seat guide rail 4. In addition, the support 5 passes through a guide rail opening 13 in the upper guide rail 4 and extends at least partially from the guide rail opening. Here, the support 5 closes the guide rail opening 13 and thereby covers the gearbox 9 and a guide rail interior space located below.

The lower seat guide rail 3 and the upper seat guide rail 4 are wrapped around one another by means of a substantially U-shaped shape characteristic thereof; these profiles have guide rail side walls 3.1, 4.1 which are folded inward or outward. A closed guide rail shape characteristic is thereby formed.

In addition, the longitudinal adjuster 2 in the structural space or cavity BR defined by the guide rail shape characteristic comprises the gear rotary shaft 6, which is connected in a fixed manner to the lower seat guide rail 3 and runs in the longitudinal direction (x-axis).

For example, one fixing element 3.2, 3.3 is respectively arranged in the lower seat guide rail 3 in order to secure the gear rotary shaft 6 in the lower seat guide rail 3. The fixing elements 3.2, 3.3 are in particular correspondingly arranged in extremity regions, formed in the longitudinal direction, of the lower seat guide rail 3. Here, at least one fixing element 3.3 may be formed as a block element, which holds the gear rotary shaft 6 in place; and one other fixing element 3.2 may be formed as an L-shaped connecting plate, which has a through-opening 3.2.1 for causing the gear rotary shaft 6 to run through and securing same.

The gear rotary shaft 6 extends substantially over the length of the lower seat guide rail 3, wherein a rotary shaft length SL of the gear rotary shaft 6 is less than the total distance GA between the two fixing elements 3.2 and 3.3.

The gear rotary shaft 6 for example at least has a length in the range of 280 mm-330 mm, in particular 320 mm, wherein a movement travel F of the gear unit G and thus the vehicle seat 1 has a maximum length in the range of 240 mm-280 mm, e.g. at least 260 mm.

In addition, the longitudinal adjuster 2 comprises one rotatable gear element 7, which acts jointly with the gear rotary shaft 6 used for longitudinal adjustment.

The gear element 7 comprises a rotary shaft nut 7.1, which is rotatably arranged on the threaded rotary shaft 6. The rotary shaft nut 7.1 has an external tooth part; a drive element 8 arranged perpendicularly to the threaded rotary shaft 6 is engaged in the external tooth part.

In the embodiment shown, the longitudinal adjuster 2 for example comprises a worm gear 8.1 (also called a drive worm gear) as the drive element 8 connected to the gear element 7; the worm gear and the gear element 7 are gear-meshed. In addition, the drive element 8 is in effective connection with the electric motor unit 12 (also called a drive electric motor) of the longitudinal adjuster 2 for example by means of the transmission unit 11.

The gearbox 9 used for receiving the gear element 7 and the drive element 8 is disposed in the upper second seat guide rail 4. The gearbox 9 is in particular formed so as to support and secure the gear element 7 and the drive element 8, with the maximum rigidity and strength possible, in the structural space BR defined by the guide rail shape characteristic.

The gearbox 9 comprises multiple box body parts 9.1-9.6, wherein two of the box body side parts 9.1, 9.5 and one box body upper part 9.3 and one box body lower part 9.6 can be seen respectively in FIGS. 2A and 2B which are shown. The box body parts 9.1-9.6 are for example connected to each other in a material-fitting, shape-fitting and/or force-fitting manner. The box body parts 9.1-9.6 are for example inserted in each other, and in particular connected to each other in a locked manner. Alternatively or additionally, these box body parts may be screwed, riveted or welded to each other.

In order to cover the drive element 8 arranged on the gear element 7, the gearbox 9 comprises the box body upper part 9.3; the box body upper part is connected in a material-fitting, shape-fitting and/or force-fitting manner at least to one of the lateral box body side parts 9.1, 9.2, 9.4 and 9.5.

In the embodiment shown, a gearbox section runs through the guide rail opening 13 formed in an upper side O of the upper second seat guide rail 4.

In order to secure and reinforce the gearbox 9, the longitudinal adjuster 2 comprises the support 5.

The support 5 is arranged in the upper second seat guide rail 4 and connected to the seat guide rail. Here, the support 5 is formed to be U-shaped, and in particular is formed as a U-shaped securing clamp. Here, the support 5 comprises two fixing legs 5.2; the fixing legs are connected at a leg extremity by means of a section 5.3 connecting extremities of the fixing legs 5.2. At opposite extremities of the fixing legs 5.2, the support 5 has a leg opening 5.1. In inserted and assembled states of the gear unit G, the leg opening 5.1 is oriented in the direction of the lower first seat guide rail 3.

In addition, in the longitudinal direction (x-axis), the support 5 has fixing legs 5.2 which are spaced apart from one another, connected to the second seat guide rail 4 and formed vertically. The fixing legs 5.2 are connected to each other by means of the section 5.3, which is formed substantially horizontally. The fixing legs 5.2 are for example connected in a material-fitting, force-fitting and/or shape-fitting manner to the respectively corresponding box body side parts 9.1 and 9.5. The fixing legs 5.2 are in particular welded to the corresponding box body parts 9.1 and 9.5 respectively.

In addition, each fixing leg 5.2 of the support 5 formed in the U-shape is connected to the second seat guide rail 4. For this purpose, each fixing leg 5.2 comprises at least one coupling element; the fixing leg 5.2 is secured at the second seat guide rail 4 by means of the coupling element.

For example, the corresponding fixing leg 5.2 is connected to the second seat guide rail 4 at three sides S1-S3. The support 5 is in particular connected in a shape-fitting (e.g. locking), force-fitting (e.g. elastically clamping) or material-fitting (e.g. welding) manner to the second seat guide rail 4 at mutually corresponding positions.

In addition, each of the fixing legs 5.2 has a through-opening 5.4 for causing the gear rotary shaft 5 to run through. In addition, the box body upper part 9.3 is spaced apart from an inner wall of the section 5.3 of the support 5. A distance A is in the range of a few millimeters, in particular in the range of 1 mm-3 mm, e.g. 1.5 mm.

Due to the arrangement shown of the support 5 formed in the U-shape, the L-shaped fixing element 3.2 can be arranged in the longitudinal adjuster 2 in a manner whereby the structural space is utilized. A lower fastening side 3.2.2 of the L-shaped fixing element 3.2 is below the gear rotary shaft 6 and oriented parallel to the gear rotary shaft 6 and in particular in the direction of the gear rotary shaft 6 and extending into the structural space BR. The fixing element 3.2 is formed in such a way that the fixing element forms an extremity stop member for the support 5 in the course of longitudinal adjustment.

Figure 3:
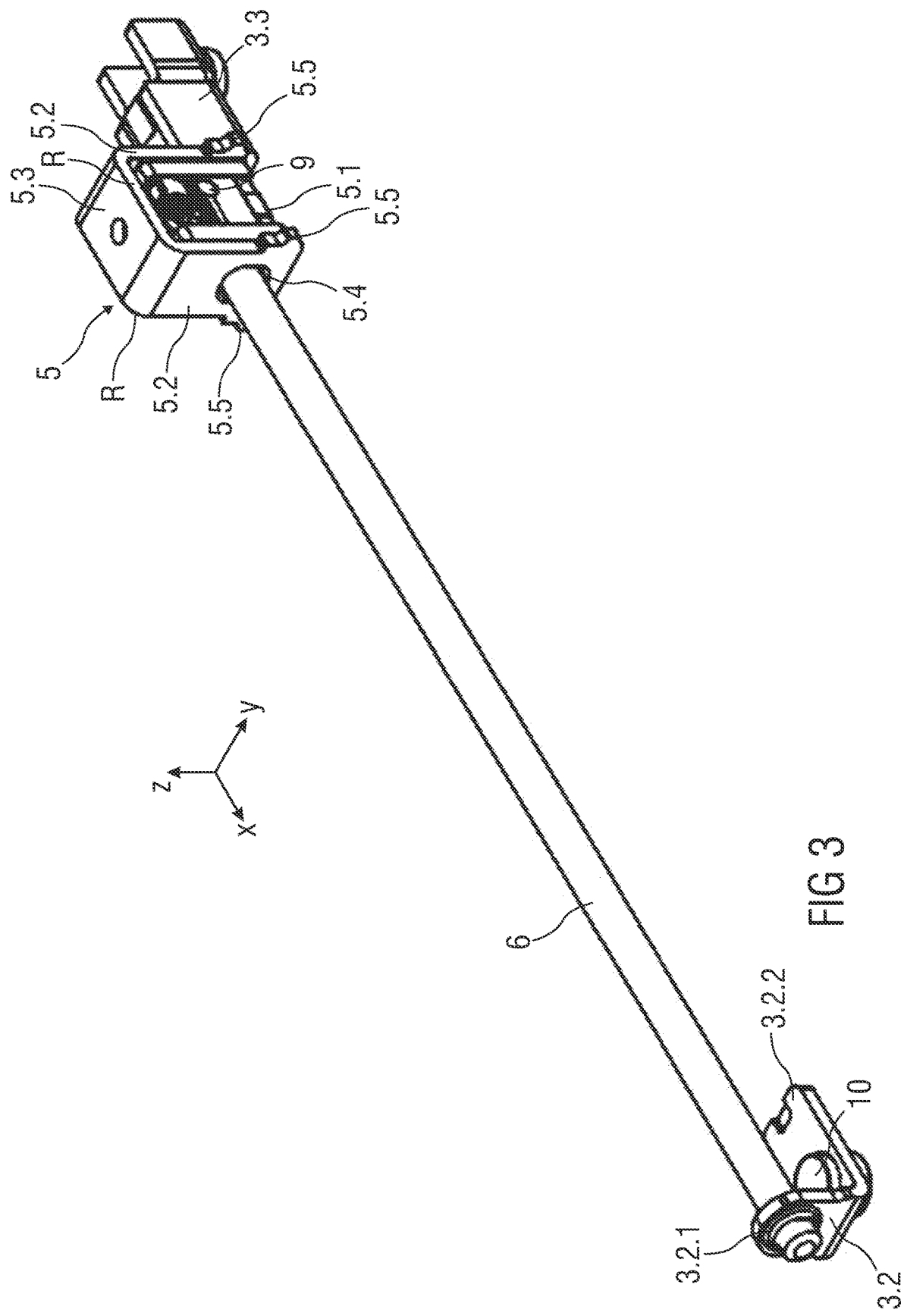
FIG. 3 is a schematic perspective view of bearing elements arranged at the gear rotary shaft of the longitudinal adjuster according to FIGS. 2A and 2B.

FIG. 3 shows a perspective view of the gear rotary shaft 6, the support 5 arranged at the gear rotary shaft 6, and the L-shaped fixing element 3.2 having the inwardly oriented fastening side 3.2.2. The inwardly oriented fastening side 3.2.2 is in particular understood to be the orientation of the fastening side 3.2.2 inward into the structural space BR of the relevant guide rail pair P1 or P2.

In the embodiment shown, each fixing leg 5.2 has a protruding part 5.5 at each lateral edge region R. The shapes of the corresponding protruding parts 5.5 correspond to lateral recesses 4.2 of the second guide rail 4. The lateral recesses 4.2, 4.3 are respectively shown in FIGS. 6A and 6B.

The protruding parts 5.5 are in particular correspondingly arranged in a lower region of the fixing legs 5.2. In addition, the protruding parts 5.5 are correspondingly formed to be stepped, and extend perpendicularly from the corresponding lateral edge region R.

In addition, when the upper seat guide rail 4 is being longitudinally adjusted, there is sufficient structural space BR below the threaded rotary shaft 6 and below the support 5 to receive a fastening pin 10 of the fixing element 3.2.

Figure 4A:
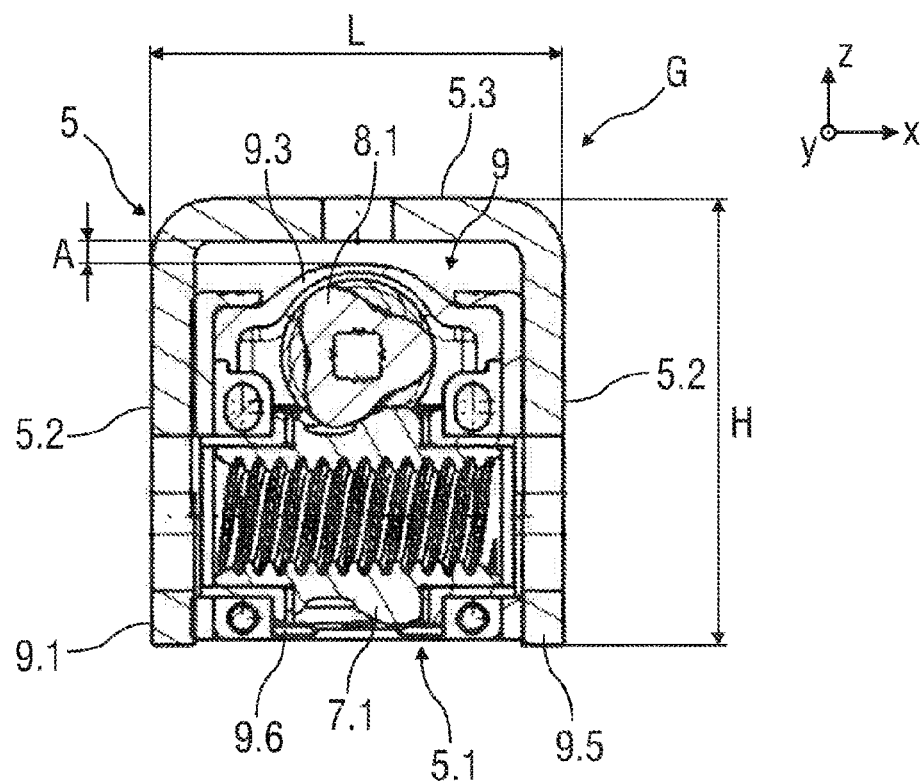
FIG. 4A is a schematic cross sectional view of the support according to FIG. 3.
Figure 4B:
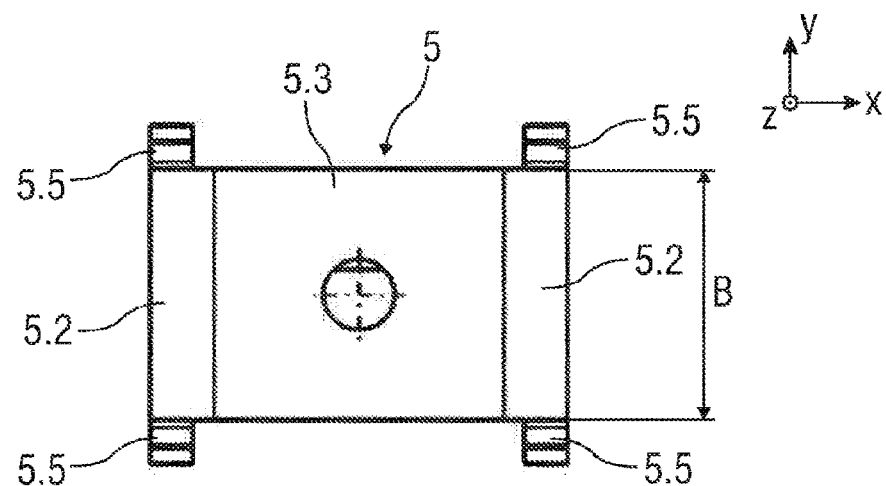
FIG. 4B is a schematic top view of the support according to FIG. 3.

FIGS. 4A and 4B show a cross section of the gear unit G or a top view of the support 5 according to FIG. 3.

The support 5 for example has a predetermined width B (in the transverse direction), a predetermined height H (in the vertical direction) and a predetermined length L (distance, extension size of the support 5 in the longitudinal direction). The total weight of the gear unit G formed by the support 5, the gearbox 9 having the gear element 7 and the drive element 8 is especially light and is in the range of 55 g-100 g, in particular 60 g-70 g, and for example is 67 g.

Figure 5A:
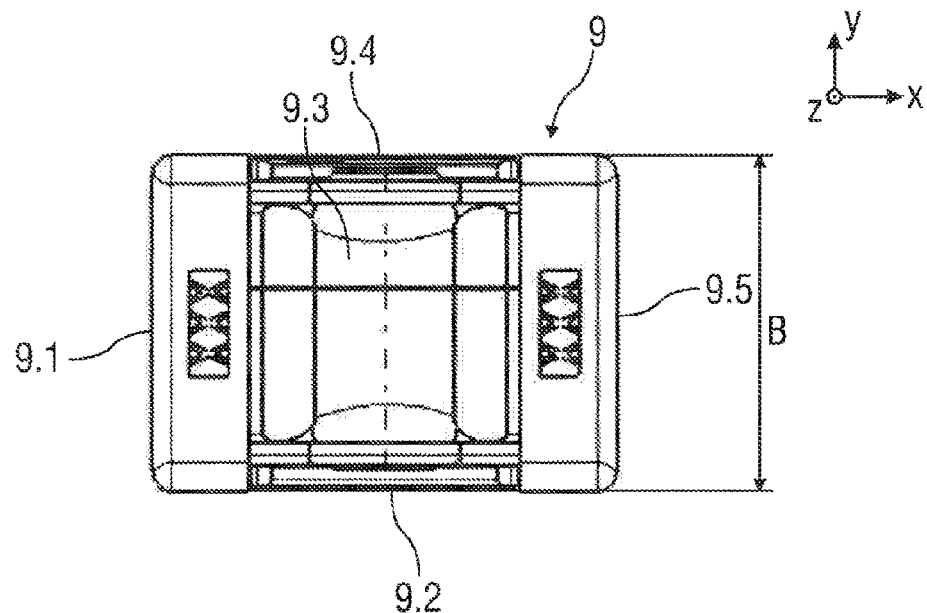
FIG. 5A is a schematic top view of the gearbox of the longitudinal adjuster according to FIGS. 2A and 2B.
Figure 5B:
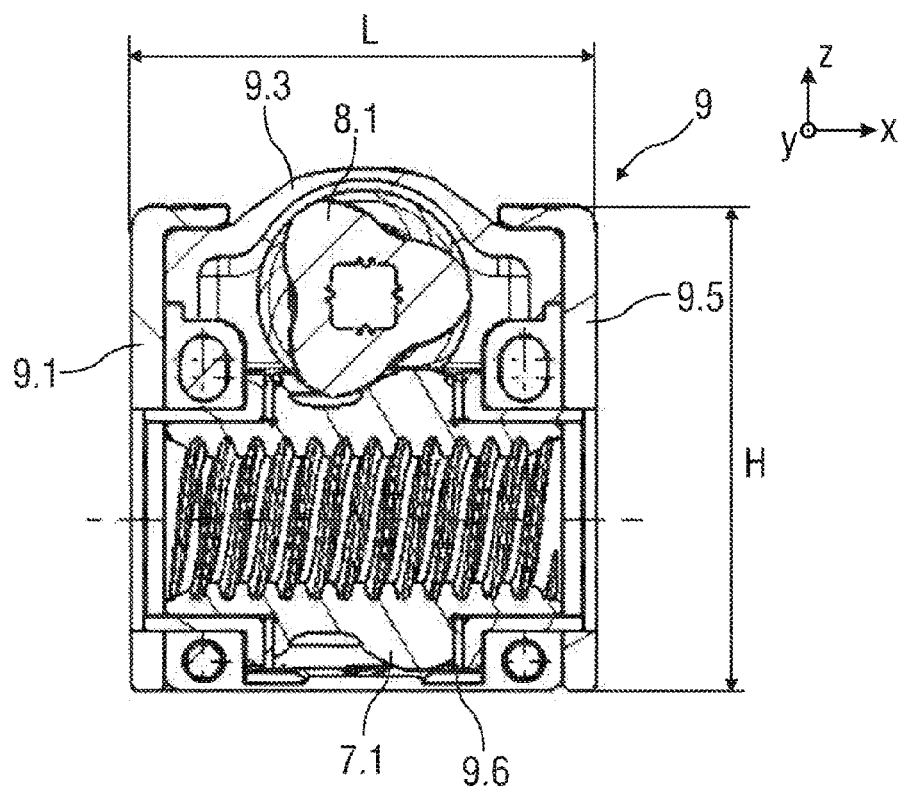
FIG. 5B is a cross sectional view of the gearbox of the longitudinal adjuster according to FIGS. 2A and 2B.

FIGS. 5A and 5B show a top view and a cross section of the gearbox 9 of the longitudinal adjuster 2 according to FIGS. 2A and 2B.

The gearbox 9 is formed to have multiple members and comprises multiple box body parts 9.1-9.6.

FIG. 5A shows a top view of the gearbox 9, which comprises the box body side parts 9.1, 9.2, 9.4 and 9.5 and one box body upper part 9.3 as box body parts.

FIG. 5B shows a cross section of the gearbox 9 having the two box body side parts 9.1 and 9.5 and the box body upper part 9.3 and one box body lower part 9.6. The box body parts 9.1-9.6 are connected to each other in a shape-fitting, force-fitting and/or material-fitting manner. For this purpose, the box body parts are in close contact with each other in particular locally, for example via edges or borders thereof. Here, the box body parts 9.1-9.6 are for example clamped, locked, plugged, screwed, welded or bonded to each other.

The gearbox 9 in particular has dimensions adapted to the support 5 and/or an adapted shape, or vice versa.

The gearbox 9 for example has a predetermined width B (in the transverse direction), a predetermined height H (in the vertical direction) and a predetermined length L. The weight of the gearbox 9 having the drive element 8 and the gear element 7 arranged inside the gearbox 9 is for example in the range of 25 g-50 g.

Figure 6A:
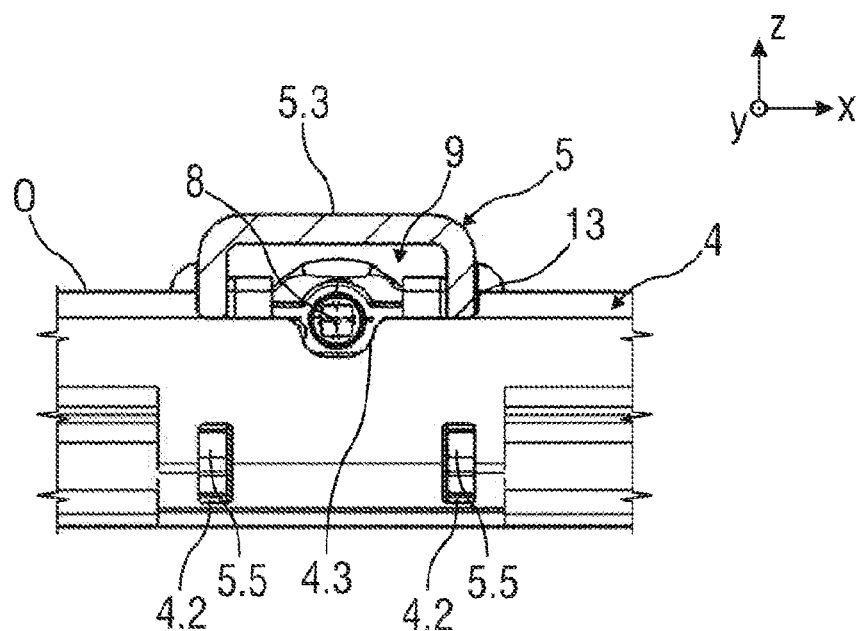
FIG. 6A is a schematic side view of an embodiment of the second seat guide rail having the support of the longitudinal adjuster.
Figure 6B:
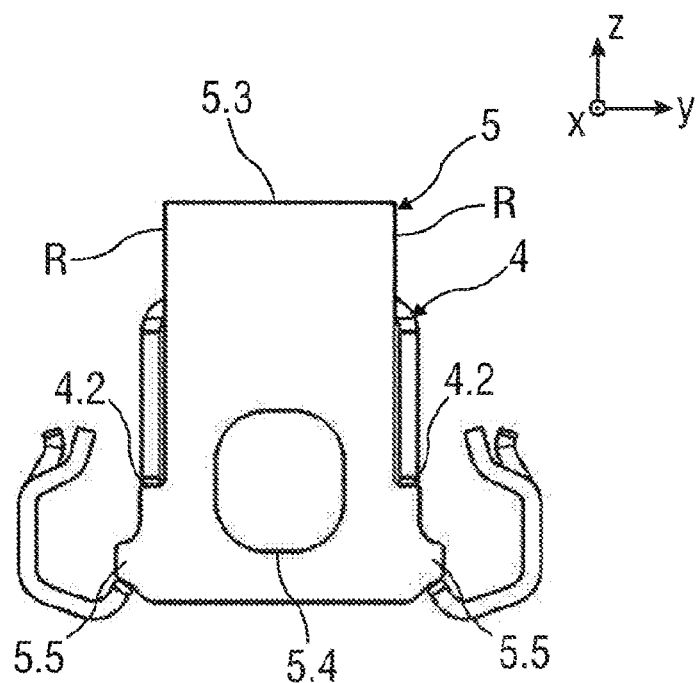
FIG. 6B is a schematic side view or a top view of an embodiment of the second seat guide rail having the support of the longitudinal adjuster.

FIGS. 6A and 6B show a side view or a top view of an embodiment of the second seat guide rail 4 having the support 5 of the longitudinal adjuster 2.

The recesses 4.2 for receiving the protruding parts 5.5 of the support 5 in a shape-fitting manner are shown in the embodiment shown. In addition, another recess 4.3 is shown; this recess is for example formed to be used for causing the drive element 8 to run through in the transverse direction.

While specific embodiments of the invention have been shown and described in detail to illustrate the application of the principles of the invention, it will be understood that the invention may be embodied otherwise without departing from such principles.

The invention claimed is:

1. A longitudinal adjuster for a vehicle seat, the longitudinal adjuster comprising:
   a guide rail arrangement, having two guide rail pairs of seat guide rails, wherein the corresponding guide rail pair comprises
   a first seat guide rail and a second seat guide rail that is movable relative to the first seat guide rail;
   an electric motor unit;
   a gear unit, having at least one gear rotary shaft formed to be connected at least to the first seat guide rail of one of the guide rail pairs;
   a rotatable gear element, which acts jointly with the gear rotary shaft;

a transmission unit, coupled to the gear unit and coupled with the electric motor unit in order to transmit a torsional force of the electric motor unit to the gear rotary shaft;
a gearbox, which at least partially accommodates the gear unit, and
a support, for receiving the gearbox, wherein the support, together with the gearbox, is arranged in a cavity formed between the first seat guide rail and the second seat guide rail of one guide rail pair, and passes through a guide rail opening in the second guide rail and extends from the guide rail opening at least partially, whereby the support closes the guide rail opening in the second guide rail;
wherein the support comprises a top and fixing legs extending from the top; and
wherein the second guide rail comprises lateral walls with slots; and
wherein the support is fixed to the second guide rail by the top within the opening and laterally by the fixing legs within the slots.

2. The longitudinal adjuster as claimed in claim 1, wherein the support is at least connected to the second seat guide rail, adjacent to the guide rail opening, in a shape-fitting, force-fitting or material-fitting manner.

3. The longitudinal adjuster as claimed in claim 1, wherein the support is configured as a U-shaped clamp, which has two of said fixing legs and a section connecting the two fixing legs.

4. The longitudinal adjuster as claimed in claim 3, wherein a leg opening of the support formed in the U-shape is oriented in the direction of the first seat guide rail, such that the gearbox is covered in relation to an upper side of the second seat guide rail by means of the section of the support connecting the two fixing legs.

5. The longitudinal adjuster as claimed in claim 3, wherein each fixing leg comprises at least one coupling element and is secured at the second seat guide rail by means of the coupling element.

6. The longitudinal adjuster as claimed in claim 3, wherein each fixing leg is connected to the second seat guide rail at three sides.

7. The longitudinal adjuster as claimed in claim 3, wherein viewed in a longitudinal direction, the guide rail opening has a stop element at opposite opening sides respectively.

8. The longitudinal adjuster as claimed in claim 3, wherein the gearbox is shape-fitting or force-fitting connected to the fixing legs.

9. The longitudinal adjuster as claimed in claim 1, wherein the second seat guide rail comprises multiple recesses.

10. The longitudinal adjuster as claimed in claim 9, wherein the fixing legs respectively comprise at least multiple protruding parts arranged at a lateral edge region, wherein shapes of corresponding protruding parts correspond to shapes of lateral recesses of the second seat guide rail.

11. The longitudinal adjuster as claimed in claim 10, wherein the protruding parts are correspondingly arranged in the lateral edge region at a bottom of the fixing legs.

12. The longitudinal adjuster as claimed in claim 10, wherein the protruding parts are correspondingly configured as stepped portions.

13. The vehicle seat as claimed in claim 1, wherein: the support is connected to the second seat guide rail adjacent to the guide rail opening; and the support is configured as a U-shaped clamp with two of said fixing legs and a section connecting the two fixing legs.

14. The vehicle seat as claimed in claim 13, wherein a leg opening of the support formed in the U-shape is oriented in a direction of the first seat guide rail, whereby the gearbox is covered in relation to an upper side of the second seat guide rail by means of the section of the support connecting the two fixing legs.

15. The vehicle seat as claimed in claim 13, wherein each fixing leg comprises at least one coupling element and is secured at the second seat guide rail by means of the coupling element.

16. The vehicle seat as claimed in claim 13, wherein each fixing leg is connected to the second seat guide rail at three sides.

17. The vehicle seat as claimed in claim 13, wherein viewed in a longitudinal direction, the guide rail opening has a stop element at opposite opening sides respectively.

18. The vehicle seat as claimed in claim 13, wherein:
the second seat guide rail comprises multiple lateral recesses;
and the fixing legs respectively comprise at least multiple protruding parts arranged at a lateral edge region;
shapes of corresponding protruding parts correspond to shapes of lateral recesses of the second seat guide rail;
the protruding parts are correspondingly arranged in the lateral edge region at a bottom of the fixing legs;
and the protruding parts are correspondingly configured as stepped portions.

19. The longitudinal adjuster as claimed in claim 13, wherein the gearbox is shape-fitting or force-fitting connected to the fixing legs.

20. A vehicle seat comprising a longitudinal adjuster for a motorized longitudinal adjustment the vehicle seat, the longitudinal adjuster comprising:
a guide rail arrangement comprising two guide rail pairs, wherein each guide rail pair comprises a first seat guide rail and a second seat guide rail that is movable relative to the first seat guide rail;
an electric motor unit;
a gear unit comprising at least one gear rotary shaft configured to be connected at least to the first seat guide rail of one of the guide rail pairs;
a rotatable gear element acting jointly with the gear rotary shaft;
a transmission unit coupled to the gear unit and coupled with the electric motor unit to transmit a torsional force of the electric motor unit to the gear rotary shaft;
a gearbox at least partially accommodating the gear unit; and
a support receiving the gearbox, wherein the support together with the gearbox is arranged in a cavity formed between the first seat guide rail and the second seat guide rail of one guide rail pair and passes through a guide rail opening in the second guide rail and extends from the guide rail opening at least partially, whereby the support closes the guide rail opening in the second guide rail;
wherein the support comprises a top and fixing legs extending from the top; and
wherein the second guide rail comprises lateral walls with slots; and
wherein the support is fixed to the second guide rail by the top within the opening and laterally by the fixing legs within the slots.

* * * * *